(12) United States Patent
Le Tinnier

(10) Patent No.: US 11,052,804 B2
(45) Date of Patent: Jul. 6, 2021

(54) ASSIST HANDLE FOR A VEHICLE PASSENGER COMPARTMENT

(71) Applicant: ILLINOIS TOOL WORKS INC., Glenview, IL (US)

(72) Inventor: Christophe Le Tinnier, Beauchamp (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/745,462

(22) Filed: Jan. 17, 2020

(65) Prior Publication Data

US 2020/0247297 A1 Aug. 6, 2020

(30) Foreign Application Priority Data

Feb. 4, 2019 (FR) ...................................... 1901053

(51) Int. Cl.
*B60N 3/02* (2006.01)
(52) U.S. Cl.
CPC .................................... *B60N 3/026* (2013.01)
(58) Field of Classification Search
CPC ...................................................... B60N 3/026
USPC ...................................................... 296/1.02
See application file for complete search history.

(56) References Cited

U.S. PATENT DOCUMENTS

| 4,912,808 | A | 4/1990 | Blakely |
| 5,632,061 | A | 5/1997 | Smith |
| 6,415,478 | B1 | 7/2002 | Watanabe |
| 7,415,751 | B2* | 8/2008 | Kato ...................... B60N 3/023 16/110.1 |
| 2006/0174584 | A1* | 8/2006 | Nakazato ............... B60N 3/026 52/834 |
| 2007/0102944 | A1 | 5/2007 | Kato |
| 2008/0018128 | A1 | 1/2008 | Yamagiwa |
| 2009/0295180 | A1 | 12/2009 | Boehner |
| 2010/0175220 | A1* | 7/2010 | Kajio ...................... B60N 3/023 16/110.1 |
| 2011/0214255 | A1* | 9/2011 | Kajio ...................... B60N 3/023 16/429 |
| 2011/0314642 | A1 | 12/2011 | Diez |
| 2012/0304418 | A1* | 12/2012 | Kajio ...................... B60N 3/023 16/110.1 |

(Continued)

FOREIGN PATENT DOCUMENTS

| CN | 103909855 | 4/2014 |
| DE | 8111051 | 11/1981 |

(Continued)

*Primary Examiner* — Jason S Morrow
(74) *Attorney, Agent, or Firm* — Thompson Hine LLP

(57) ABSTRACT

An assist handle (10) for a vehicle passenger compartment includes a gripping body (12) having at least one base (14) for bearing on and fastening to a wall of the passenger compartment. At least one clip (18) is carried by the base or each base and configured to fasten the handle to the wall. The clip is configured to be engaged at least partially in an orifice in the wall and includes at least one elastically deformable tab (28) configured to cooperate by elastic snap-fastening with an edge of the orifice. The clip also includes at least one first element (30) which is configured to cooperate by elastic snap-fastening with at least one second element (22) formed in one piece with the base, so as to fasten the clip to the base.

19 Claims, 10 Drawing Sheets

(56) References Cited

U.S. PATENT DOCUMENTS

| | | | | |
|---|---|---|---|---|
| 2014/0093311 A1* | 4/2014 | Masuda | ............... | F16B 17/00 |
| | | | | 403/326 |
| 2015/0232011 A1* | 8/2015 | Kajio | ............... | B60N 3/026 |
| | | | | 296/1.02 |
| 2016/0214520 A1* | 7/2016 | Kajio | ............... | B60N 3/023 |
| 2020/0180486 A1* | 6/2020 | Cramer | ............... | B60N 3/026 |

FOREIGN PATENT DOCUMENTS

| | | |
|---|---|---|
| DE | 202005011297 | 11/2005 |
| EP | 0743461 | 11/1996 |
| EP | 1880898 | 1/2008 |
| FR | 2761422 | 10/1998 |
| GB | 2420824 | 6/2006 |
| JP | 2003269013 | 9/2003 |
| WO | WO 2011103068 | 8/2011 |

* cited by examiner

ASSIST HANDLE FOR A VEHICLE PASSENGER COMPARTMENT

TECHNICAL FIELD OF THE INVENTION

The present invention relates to an assist handle for a vehicle passenger compartment, in particular for an automobile.

PRIOR ART

The passenger compartment of a vehicle is generally equipped with at least one assist handle, which is also known as a corner-turning handle. A handle of this type is, for example, located above the front passenger seat of the vehicle, just above the door opening. The handle is generally fastened directly to the vehicle bodywork.

A handle of this type comprises:
- a gripping body linked to two bases for bearing on and fastening to a wall of the bodywork, and
- a clip carried by each of the bases and configured to fasten the handle to the wall. Each clip is configured to be engaged in an orifice in the wall, generally through an opening in an interior lining of this wall, and comprises an elastically deformable tab configured to cooperate by elastic snap-fastening with an edge of the orifice in order to fasten the handle to the bodywork.

In current technology, the clip is held securely on the base by means of a member attached to the base, which may be a cover.

The assembly of a handle in current technology thus comprises a step of mounting the clips on the bases of the body and a following step of mounting members for securing the clips to the bases. Assembly is thus relatively long for a relatively simple article. Furthermore, there is a risk of the members being mounted defectively and of accidental loss of these members in the course of use of the handle.

The present invention proposes a simple, effective and economical solution to these problems.

SUMMARY OF THE INVENTION

To that end, the invention proposes an assist handle for a vehicle passenger compartment, having:
- a gripping body having at least one base for bearing on and fastening to a wall of the passenger compartment, and
- at least one clip carried by the base or each base and configured to fasten the handle to said wall, this clip being configured to be engaged at least partially in an orifice in the wall and having at least one elastically deformable tab configured to cooperate by elastic snap-fastening with an edge of this orifice, characterized in that the clip also comprises at least one first element which is configured to cooperate by elastic snap-fastening with at least one second element formed in one piece with the base, so as to fasten the clip to the base.

The handle according to the invention thus does not comprise an attached member designed to secure the clip to the body. Indeed, the clip is, here, configured to cooperate with a part of the body, and in particular a part of the base of the body, which is formed in one piece with this base. Mounting of the clip and also the assembly of a handle according to the invention are thus simplified and there is no likelihood of defective mounting or of loss of the clip during use.

The handle according to the invention may comprise one or more of the following features, taken separately from one another or in combination with one another:
- the clip has the overall shape of a U and comprises two lateral arms linked by a bridge,
- said at least one tab is situated on one or each of said arms,
- said at least one first element is situated on one or each of said arms,
- said at least one first element comprises an orifice,
- said orifice comprises a peripheral edge, a rectilinear portion of which is defined by an L-shaped lip of the clip,
- said at least one second element comprises a boss configured to be engaged in said orifice, this boss having a ramp on which the clip is configured to slide, and also a stop against which the clip is configured to bear in order to prevent it from detaching from the base,
- the base has a low wall which is engaged in the clip and between the arms thereof, this low wall having two opposite lateral surfaces, on each of which said protruding boss is situated,
- the bridge of the clip comprises an orifice for receiving a finger of the base,
- the clip has a plane of symmetry that is parallel to the arms and passes between these arms,
- the clip is formed in one piece, preferably from sheet metal,
- the handle also comprises at least one cover attached to the base or each base of the body.

BRIEF DESCRIPTION OF THE FIGURES

The invention will be better understood and further details, features and advantages of the invention will become more clearly apparent upon reading the following description that is given by way of nonlimiting example and with reference to the appended figures, in which.

DETAILED DESCRIPTION OF THE INVENTION

Figure 1:
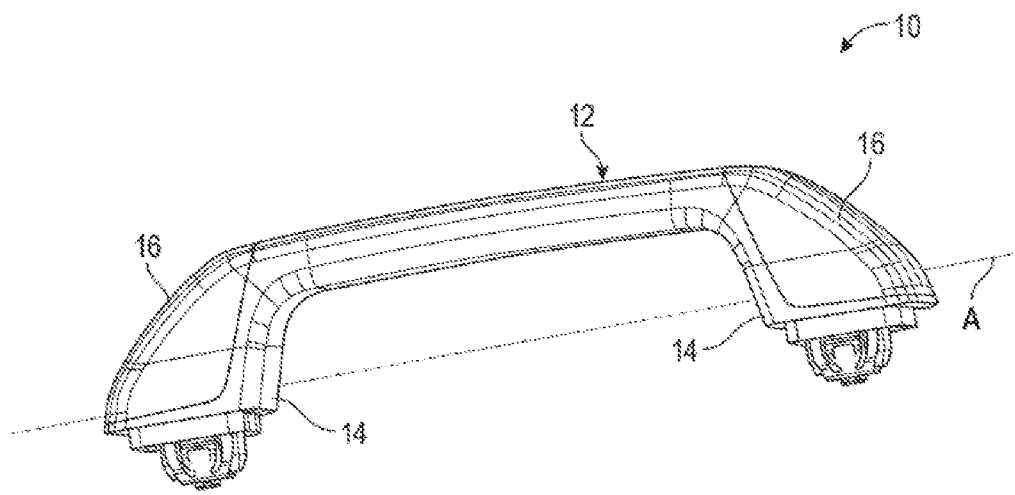
FIG. 1 is a schematic perspective view of an assist handle according to one embodiment of the invention.
Figure 2:
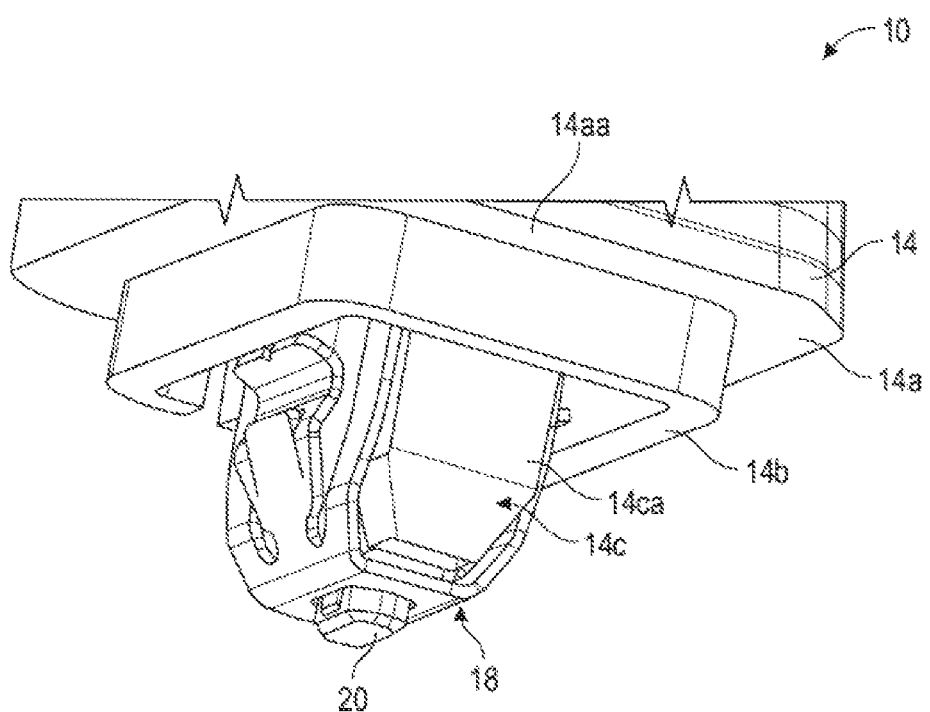
FIG. 2 is a schematic perspective view, on a larger scale, of a base of the handle of FIG. 1, this base being equipped with a fastening clip.

FIGS. 1 to 7 illustrate a first embodiment of an assist handle 10 according to the invention.

The handle 10 is designed to equip a passenger compartment of a vehicle, in particular an automobile, and is, for example, fastened to the vehicle bodywork, just above the opening of the front door located on the passenger side of the vehicle.

In the exemplary embodiment shown in the drawings, the handle 10 has a gripping body 12 that has two bases 14 for bearing on and fastening to the bodywork. The body has an elongate form and the bases 14 are located at the longitudinal ends of the body. However, the number of bases 14 is not limiting. Furthermore, although the bases 14 are, here, formed in one piece with the body 12 of the handle, this aspect is, here, likewise not limiting. By way of example, the body 12 may be articulated to the bases 14 about a common axis, referenced A by way of illustration, such as to be able to be folded down when the handle 10 is not in use, in order to limit the space it requires in the vehicle passenger compartment.

In the example shown, each base 14 receives a cover 16 designed to improve the aesthetic appearance of the handle 10 and to conceal a fastening clip 18 mounted on each base 14.

Each base 14 comprises a planar wall 14a, a lower surface 14aa of which is designed to bear on the bodywork or on an interior lining of this bodywork, and also a shoe 14b projecting from the surface 14aa and designed to be engaged in an orifice of complementary form in the bodywork.

In the example shown, the shoe 14b has an overall U or O form and is designed to extend along at least a part of the peripheral edge of the orifice in the bodywork in order to cooperate by abutment with this edge and thereby to ensure that the handle is held in position in a plane parallel to the wall 14a.

The base 14 further comprises a low wall 14c that extends in a plane perpendicular to the wall 14a and a first, lower part 14ca of which is located below the wall 14a and a second, upper part 14cb of which is located above the wall 14a.

The lower part 14ca of the low wall 14c has, at the lower free end thereof, a projecting finger 20. The upper part 14cb comprises two opposite parallel lateral faces 21, on each of which there is a projecting boss 22.

Each boss 22 comprises a ramp 22a and a stop 22b. The ramp 22a has a gradient that is, here, continuous and oriented downwards. The lower end of the ramp 22a is located at the corresponding face 21, and the stop 22b is located at the upper end of the ramp 22a that links this upper end to the face 21. This stop 22b comprises a surface oriented perpendicularly to the face 21.

The low wall 14c has a plane of symmetry parallel to the faces 21 and passes between these faces.

The wall 14a comprises two apertures 24 of elongate form that are parallel and arranged on each side of the low wall 14c. The apertures 24 extend along the faces 21 and traverse the wall 14a so that the faces 21 extend continuously as far as the lower free end of the low wall 14c, which comprises the finger 20, and which may be formed as a point as in the example shown.

Figure 3:
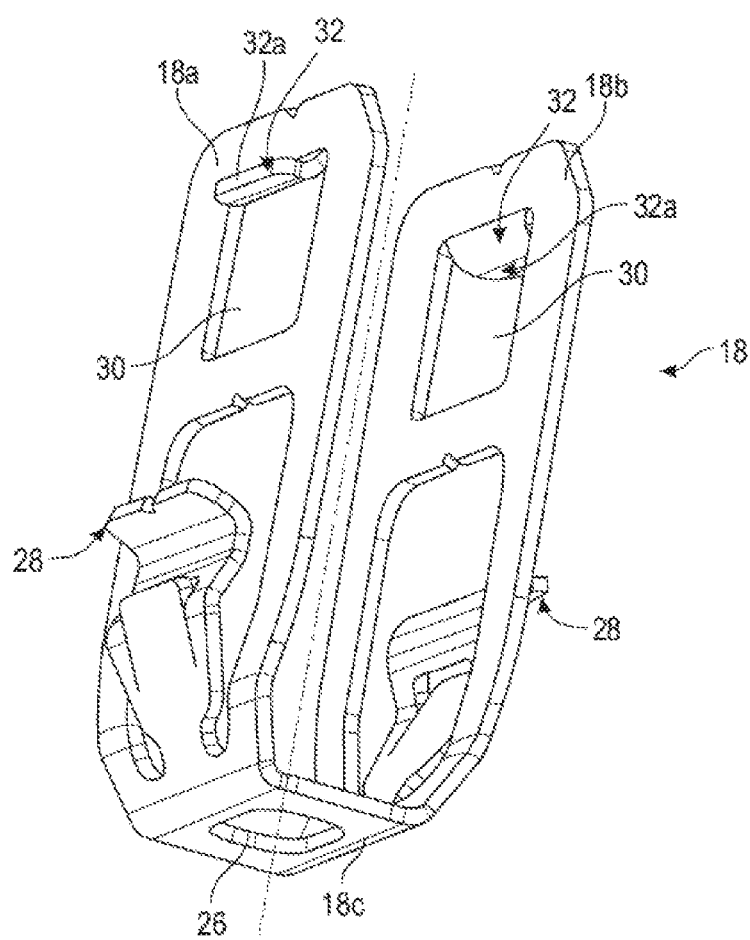
FIG. 3 is a schematic perspective view of a fastening clip for the handle of FIG. 1.
Figure 4:
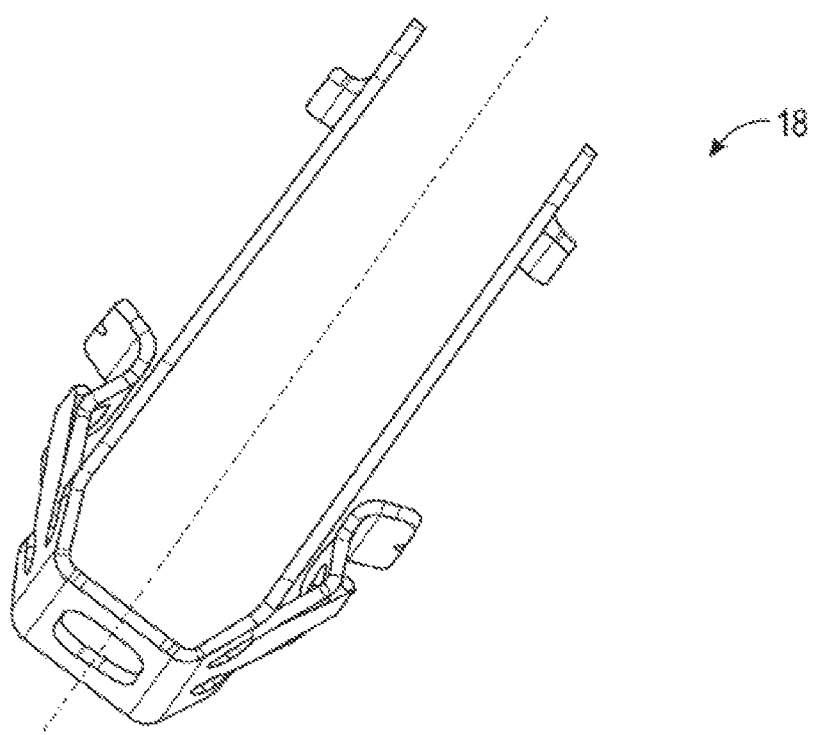
FIG. 4 is another schematic perspective view of a fastening clip for the handle of FIG. 1.
Figure 5:
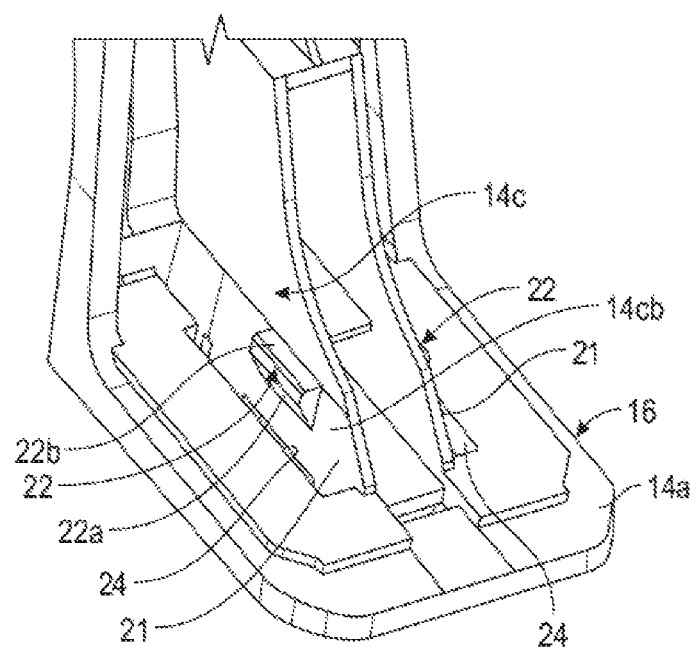
FIG. 5 is another schematic perspective view of the base of the handle of FIG. 1, without the clip.
Figure 6:
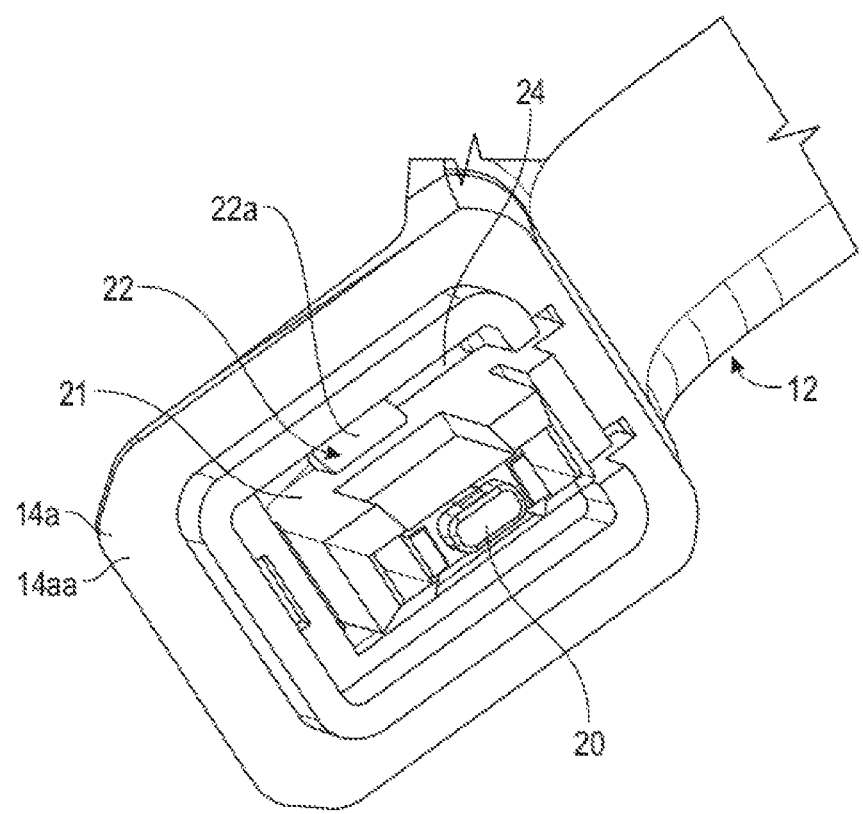
FIG. 6 is another schematic perspective view of the base of the handle of FIG. 1, without the clip.
Figure 7:
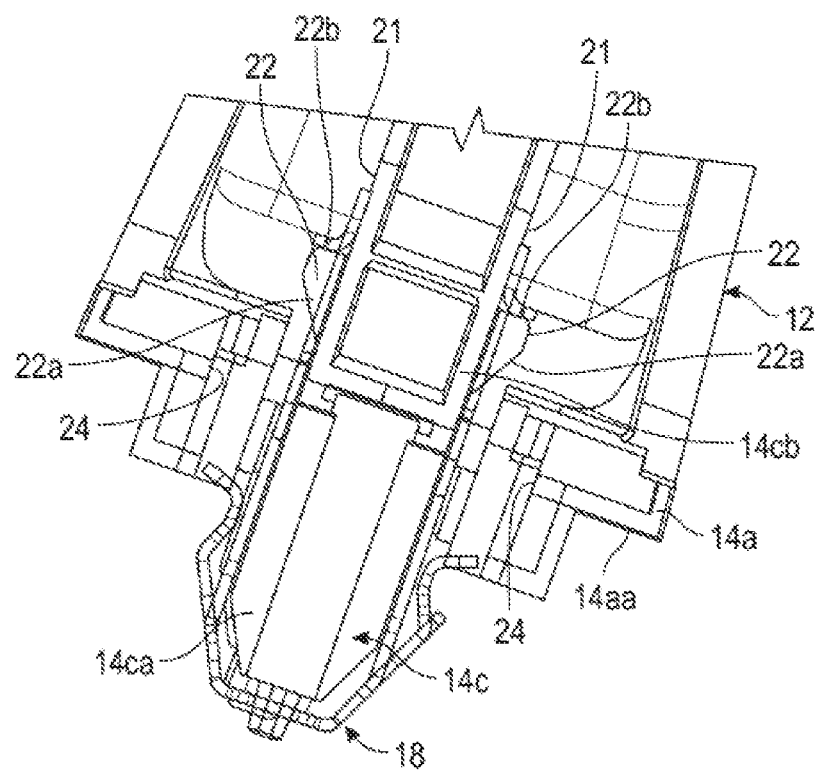
FIG. 7 is a schematic view in cross section and in perspective of the base of the handle of FIG. 1, equipped with the clip.

The clip 18 is easier to see in FIGS. 3 and 4. It has an overall U form and may be produced from sheet metal. It may, for example, be formed by bending and/or stamping a metal sheet.

The clip 18 comprises two lateral arms 18a, 18b linked to one another by a bridge 18c.

The bridge 18c comprises an orifice 26 configured to receive the finger 20 of the low wall 14c of the base 14.

The arms 18a, 18b have, on the one hand, elastically deformable tabs 28 and first elements configured to cooperate by elastic snap-fastening with second elements formed in one piece with the base 14. In the example shown, these second elements are formed by the bosses 22 and the first elements of the clip 18 are formed by orifices 30 of the arms 18a, 18b. In a variant, the reverse could be envisaged, namely the clip could comprise bosses or additional tabs designed to be engaged by elastic snap-fastening in recesses in the low wall of the base.

Figure 8:
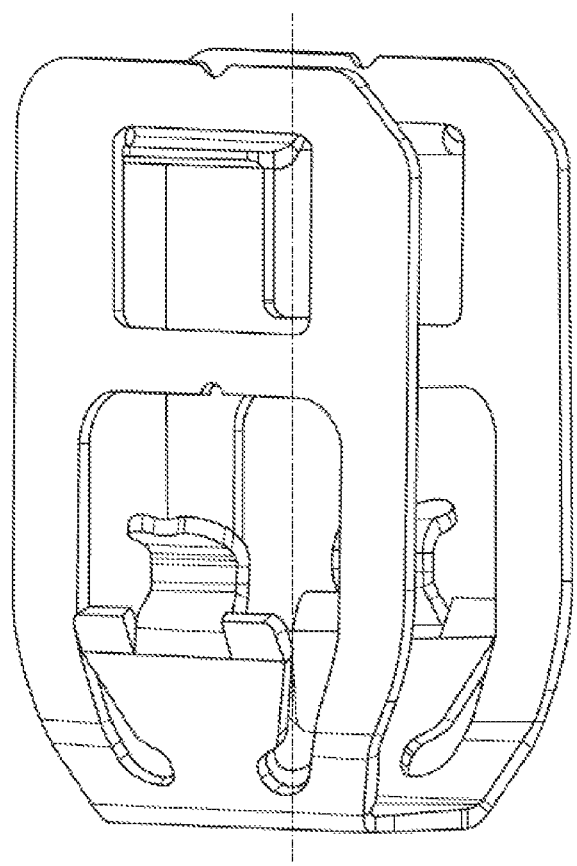
FIG. 8 is a schematic perspective view of a clip for a handle according to a variant embodiment of the invention.
Figure 9:
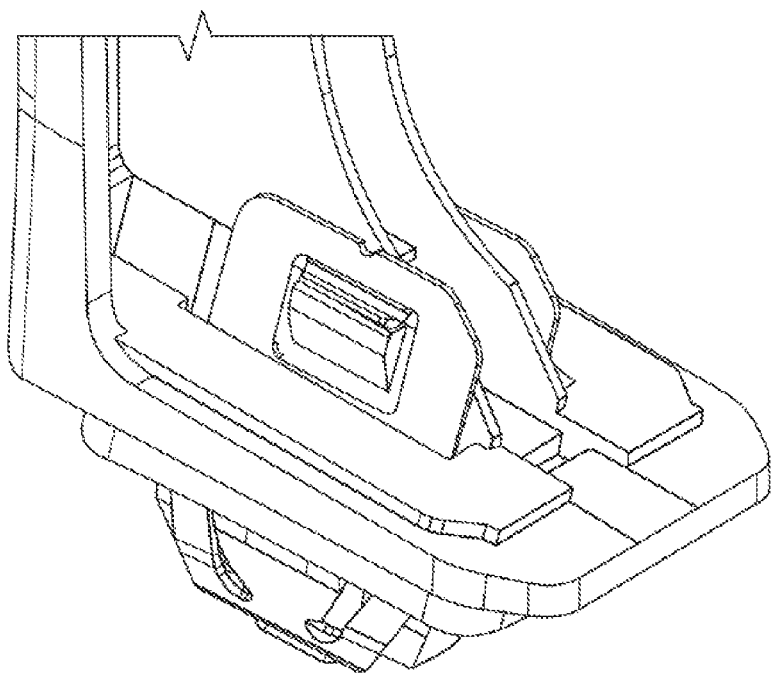
FIG. 9 is a schematic perspective view of a base for the variant embodiment of the handle, this base being equipped with the clip of FIG. 8.
Figure 10:
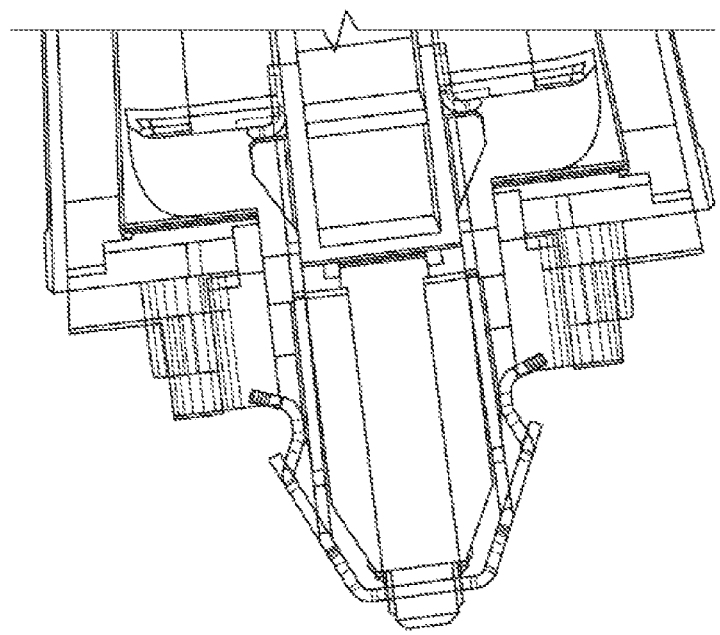
FIG. 10 is a schematic view in cross section and in perspective of the base of the handle of FIG. 9, equipped with the clip.

The tabs 28 are formed to cooperate by elastic snap-fastening with a peripheral edge of the orifice in the bodywork in which the lower part of the low wall 14c is designed to be engaged. The form of these tabs 28 is not limiting, as is illustrated with the variant embodiment in FIGS. 8 to 10.

The tabs 28 are located in a lower half of the arms 18a, 18b of the clip 18 and the orifices 30 are located in an upper half of these arms.

In the example shown, each orifice 30 has an overall rectangular shape that substantially complements that of a boss 22 in order to allow the engagement of the boss in this orifice. The orifice 30 is delimited by a peripheral edge that is thus rectangular and a rectilinear portion of which, in this case an upper portion of which, is formed by an L-shaped lip 32. This L-shaped lip may be obtained by folding. It comprises, here, a flange 32a oriented towards the exterior (the interior being located between the arms 18a, 18b), and which comprises a lower bearing surface.

The clip 18 has a plane of symmetry parallel to the arms 18a, 18b and passes between these arms.

The clip 18 is mounted on the base 14 by engaging the low wall 14c between the arms 18a, 18b until such time as, on the one hand, the finger 20 engages in the orifice 20 of the clip 18 and, on the other, the arms 18a, 18b slide over the faces 21 and the ramps 22a until the bosses 22 are engaged in the orifices 30 and the lip 32 bears on the stops 22b of the bosses. The clip is elastically snap-fastened on the base by elastic deformation of the arms 18a, 18b, at the time of their sliding over the ramps of the bosses, and elastic return of the arms bearing on the faces 21 when the lips cooperate with the stops 22b of the ramps.

The invention claimed is:

1. An assist handle (10) for a vehicle passenger compartment, comprising:
    a gripping body (12) having spaced apart first and second bases (14) for bearing on and fastening to a wall of the passenger compartment and an elongated grip section extending between the first and second bases, and
    a clip (18) carried by the first base and configured to fasten the assist handle to said wall, the clip being configured to be engaged at least partially in an orifice in the wall and having at least one elastically deformable tab (28) configured to cooperate by elastic snap-fastening with an edge of the orifice,
wherein the clip also comprises at least one first element (30) and the first base also comprises at least one second element (22), wherein the at least one first element is configured to cooperate by elastic snap-fastening with the at least one second element (22) so as to fasten the clip to the first base, wherein the elongated grip section, the first and second bases and the at least one second element are all formed together in one piece.

2. The assist handle (10) according to claim 1, wherein the clip (18) has an overall shape of a U and comprises two lateral arms (18a, 18b) linked by a bridge (18c).

3. The assist handle (10) according to claim 2, wherein said at least one tab (28) is situated on one or each of said lateral arms (18a, 18b).

4. The assist handle (10) according to claim 3, wherein said at least one first element (30) is situated on one or each of said lateral arms (18a, 18b).

5. The assist handle (10) according to claim 4, wherein the bridge (18c) of the clip (18) comprises an orifice (26) for receiving a finger (20) of the base (14).

6. The assist handle (10) according to claim 2, wherein the clip (18) has a plane of symmetry that is parallel to the lateral arms (18a, 18b) and passes between the lateral arms.

7. The assist handle (10) according to claim 1, wherein said at least one first element comprises an orifice (30).

8. The assist handle (10) according to claim 7, wherein said orifice comprises a peripheral edge, a rectilinear portion of which is defined by an L-shaped lip (32) of the clip (18).

9. The assist handle (10) according to claim 8, wherein said at least one second element comprises a boss (22) configured to be engaged in said orifice (30), this boss having a ramp (22a) on which the clip (18) is configured to slide, and also a stop (22b) against which the clip is configured to bear in order to prevent the clip from detaching from the base (14).

10. The assist handle (10) according to claim 9, wherein the base has a low wall (14c) which is engaged in the clip (18) and between the arms (18a, 18b) thereof, this low wall having two opposite lateral surfaces (21), on each of which said protruding boss (22) is situated.

11. The assist handle (10) according to claim 1, wherein the clip (18) is formed in one piece from sheet metal.

12. The assist handle (10) according to claim 1, further comprising a first cover (16) attached to the first base (14) and a second cover (16) attached to the second base.

13. An assist handle (10) for a vehicle passenger compartment, comprising:
 a gripping body (12) having a base (14) for bearing on and fastening to a wall of the passenger compartment, and
 a clip (18) carried by the base and configured to fasten the assist handle to said wall, the clip being configured to be engaged at least partially in an orifice in the wall and having at least one elastically deformable tab (28) configured to cooperate by elastic snap-fastening with an edge of this orifice,
 wherein the clip also comprises at least one first element (30) which is configured to cooperate by elastic snap-fastening with at least one second element (22) formed in one piece with the base, so as to fasten the clip to the base;
 wherein said at least one first element comprises an orifice (30);
 wherein said at least one second element comprises a boss (22) configured to be engaged in said orifice (30) of said at least one first element, the boss having a ramp (22a) on which the clip (18) is configured to slide, and also a stop (22b) against which the clip is configured to bear in order to prevent the clip from detaching from the base (14).

14. The assist handle (10) according to claim 13, wherein the clip (18) has an overall shape of a U and comprises two lateral arms (18a, 18b) linked by a bridge (18c).

15. The assist handle (10) according to claim 14, wherein said at least one tab (28) is situated on one or each of said lateral arms (18a, 18b).

16. The assist handle (10) according to claim 15, wherein said at least one first element (30) is situated on one or each of said lateral arms (18a, 18b).

17. The assist handle (10) according to claim 16, wherein the bridge (18c) of the clip (18) comprises an orifice (26) for receiving a finger (20) of the base (14).

18. The assist handle (10) according to claim 14, wherein the clip (18) has a plane of symmetry that is parallel to the lateral arms (18a, 18b) and passes between the lateral arms.

19. The assist handle (10) according to claim 13, further comprising at least one cover (16) attached to the base (14).

* * * * *